Feb. 10, 1970 S. A. KNIGHT 3,495,085
APPARATUS FOR TRACKING AN INFRARED RADIATION GRADIENT AND
READOUT MEANS THEREFOR
Filed July 26, 1965 6 Sheets-Sheet 1
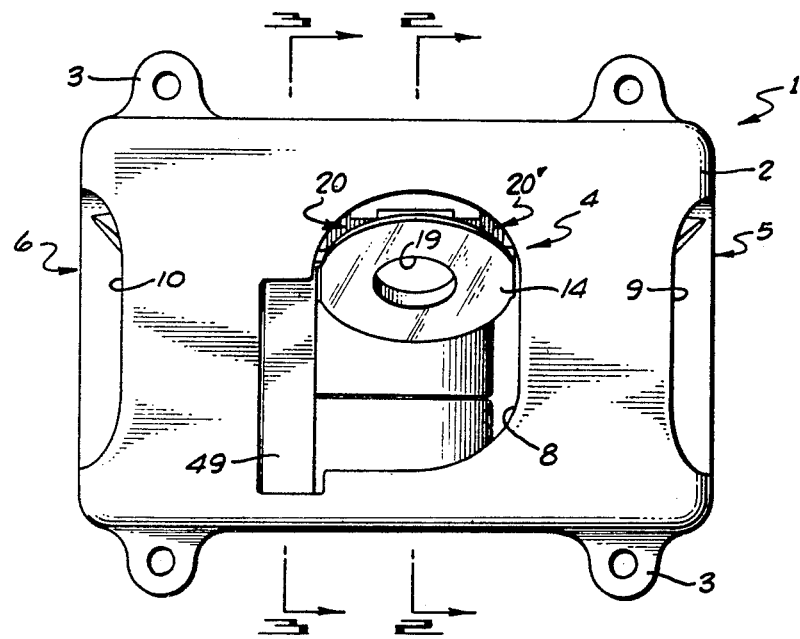
FIG_1
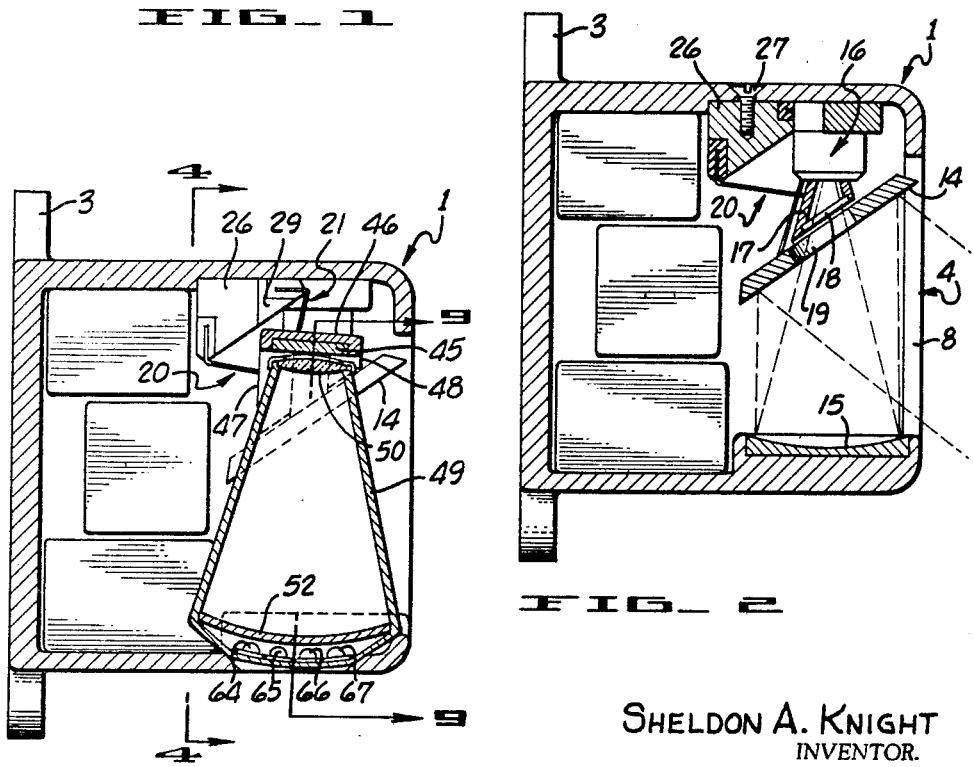
FIG_3   FIG_2
SHELDON A. KNIGHT
INVENTOR.
BY
Leon F. Herbert
ATTORNEY

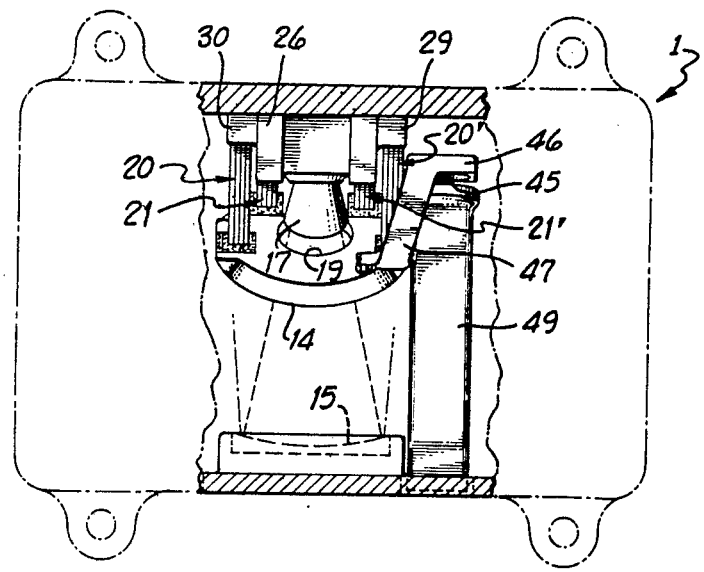
FIG_4
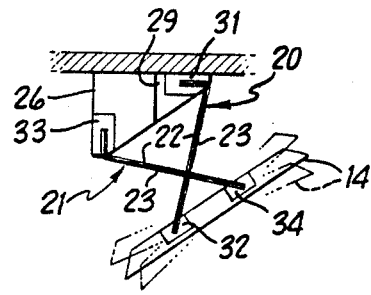
FIG_5
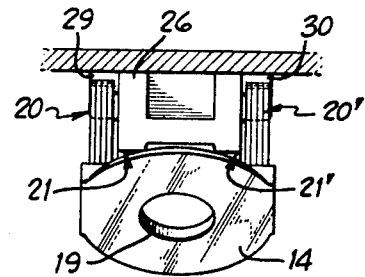
FIG_6
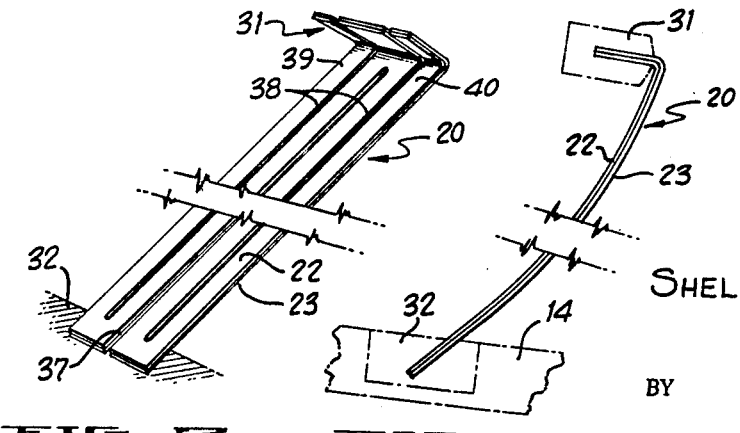
FIG_7    FIG_8
SHELDON A. KNIGHT
INVENTOR.
BY
Leon F. Herbert
ATTORNEY

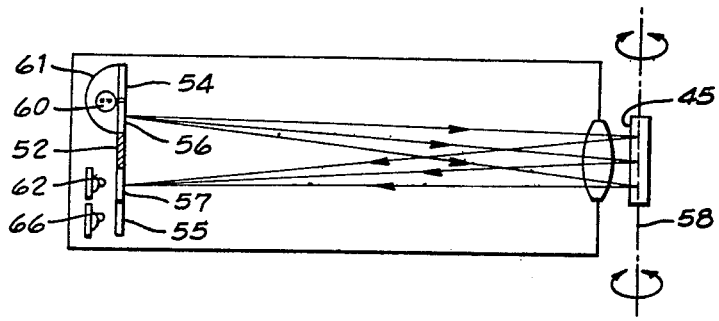
FIG_9
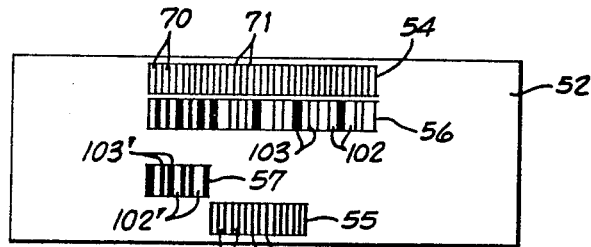
FIG_10
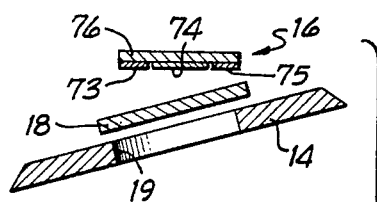
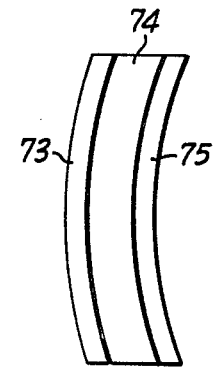
FIG_12
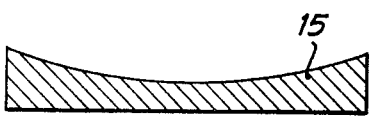
FIG_11
SHELDON A. KNIGHT
INVENTOR.
BY Leon F. Herbert
ATTORNEY

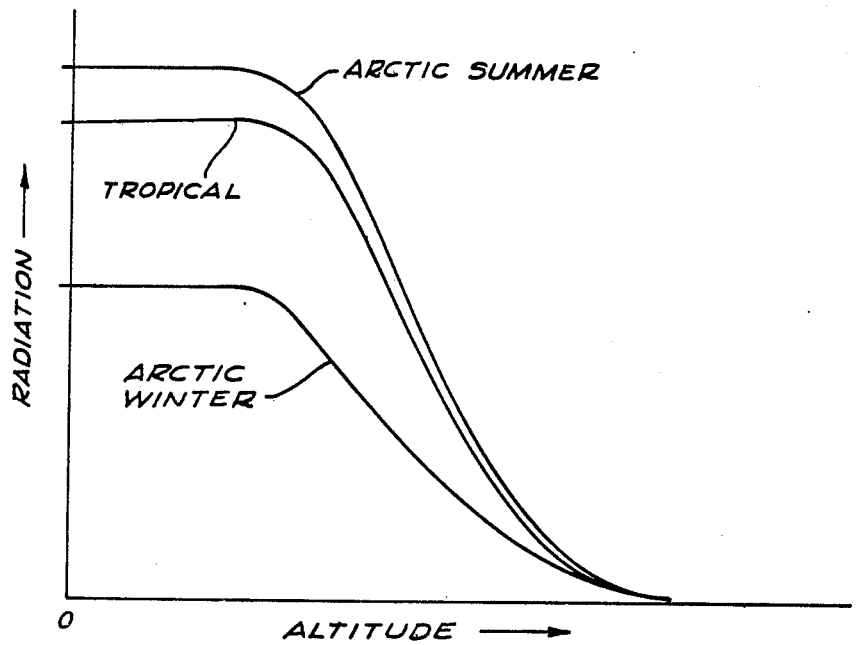
FIG_13
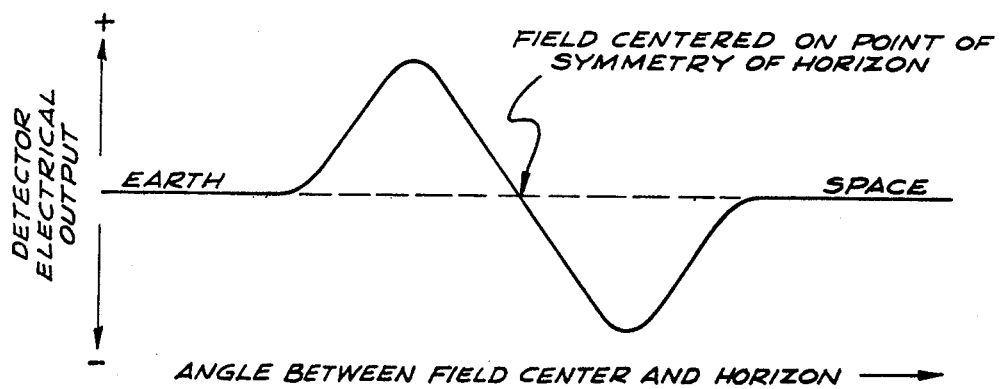
FIG_14

Feb. 10, 1970     S. A. KNIGHT     3,495,085
APPARATUS FOR TRACKING AN INFRARED RADIATION GRADIENT AND
READOUT MEANS THEREFOR
Filed July 26, 1965     6 Sheets-Sheet 5
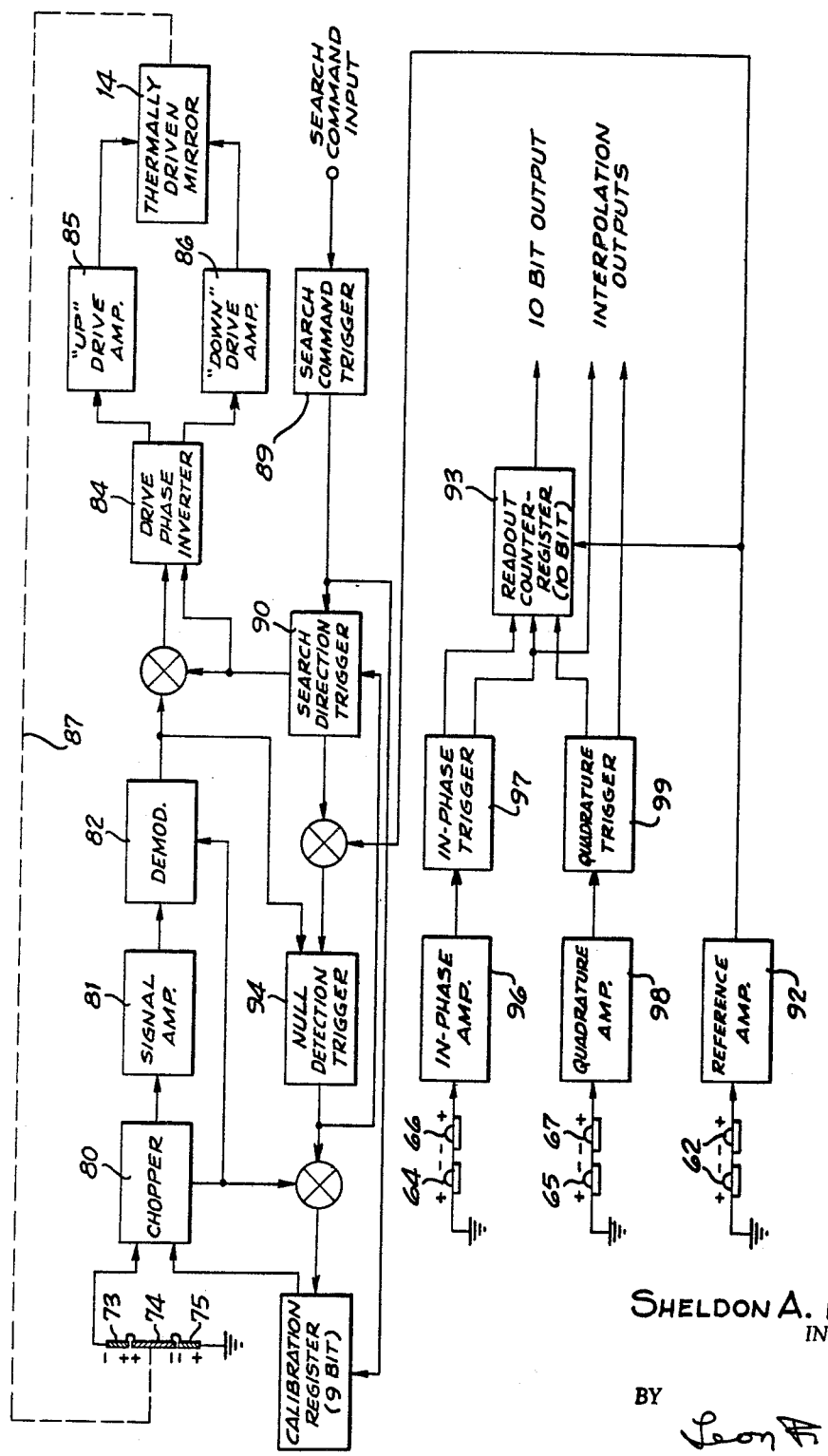
SHELDON A. KNIGHT
INVENTOR.
BY *Leon F. Herbert*
ATTORNEY

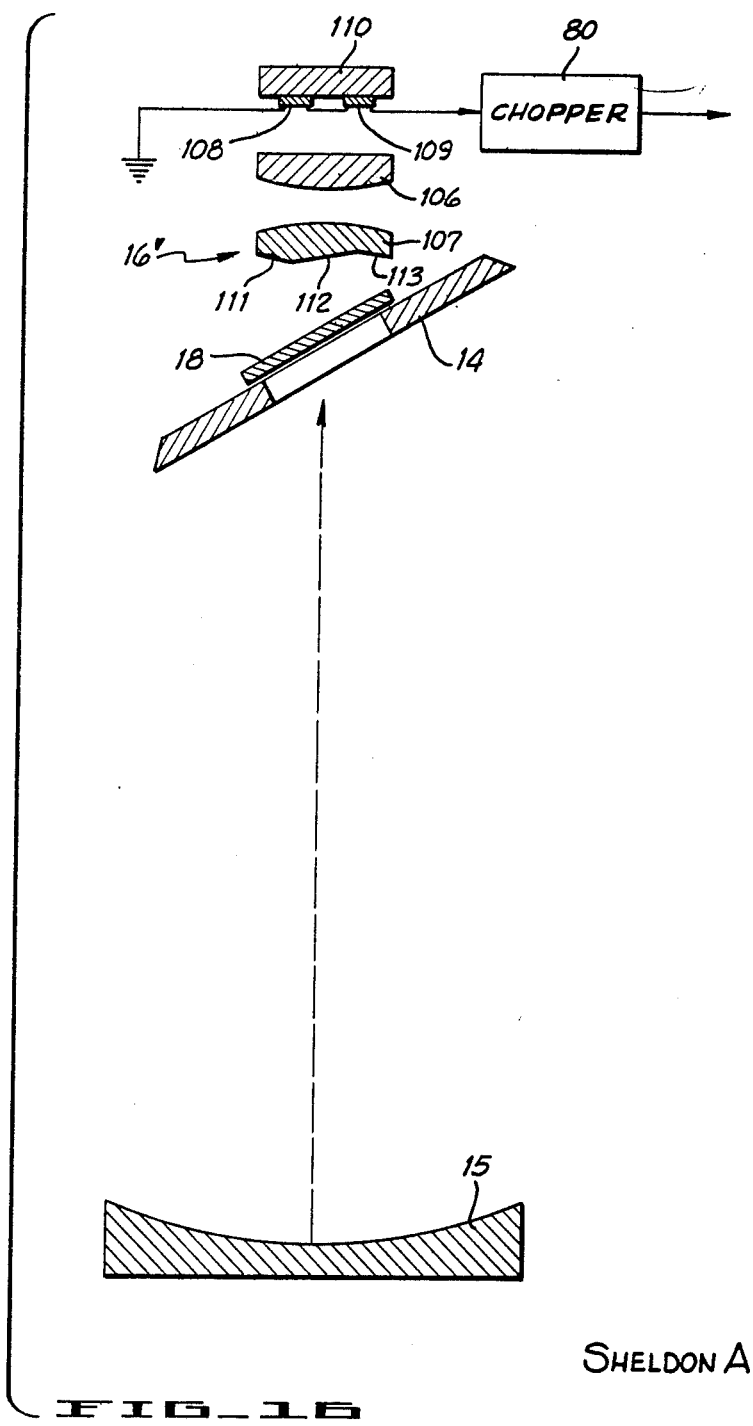

United States Patent Office 3,495,085
Patented Feb. 10, 1970

3,495,085
APPARATUS FOR TRACKING AN INFRARED RADIATION GRADIENT AND READOUT MEANS THEREFOR
Sheldon A. Knight, Mountain View, Calif., assignor to Quantic Industries, Inc., San Carlos, Calif., a corporation of California
Filed July 26, 1965, Ser. No. 474,613
Int. Cl. G01t 1/16
U.S. Cl. 250—83.3    8 Claims

ABSTRACT OF THE DISCLOSURE

Apparatus for tracking the infrared radiation gradient of the earth's atmosphere to reference the attitude of a space craft relative to the earth. A thermocouple array for sensing the infrared horizon is divided into three parts positioned adjacent to each other. They are electrically connected so that when the tracker reaches the point of symmetry of the infrared horizon gradient the output of the array is zero. Displacement from this point of symmetry in either the direction of the earth or space will produce a polarity output which indicates the direction of displacement. From a readout standpoint the amount of movement of the tracker is provided by an optical system where light is projected through a slitted primary mask toward a mirror attached to the horizon tracker and is collimated by an intermediate lens. Sensing photodetectors are located behind a secondary counting mask which is in the same plane as the projection mask. The secondary mask has a different number of slits per unit length to provide a moiré pattern. The position of the pattern is sensed by the photodetectors and from signal voltages produced by them the angular displacement of the mirror and tracker is ascertained. The primary and secondary masks also include reference positions which have slits of random width and spacing. These provide a reference pulse for counting means. The collimation and decollimation of the optical system removes the dependence on the translational position of the mirror. The mirror itself is controllably moved by electrical energy applied to crossed bimetallic strips providing a means of moving the mirror without bearings. The mirror may be rotated in either direction and the crossed strips cancel any effects of ambient temperature.

---

This invention relates to radiation gradient sensing apparatus, and more particularly to apparatus for tracking the infrared radiation gradient of the earth's atmosphere.

In the field of space navigation and attitude control, it is important to be able to reference the attitude of the space craft relative to the earth. One means for accomplishing this task is to employ a device which is sensitive to the fact that space is substantially devoid of infrared radiation whereas the earth is a source of a high level of infrared radiation. As a result, at the earth's horizon there is a change or gradient of radiation from high at the earth to zero out in space. Conventional detector devices are available to register incoming infrared radiation. Such detector devices can be placed on a space craft and the image of the earth focused thereon. Such an arrangement would supply the information that the detector was looking at a spot somewhere on the earth or somewhere out in space, but this information of course does not provide the required knowledge. It is necessary that the detector be somehow arranged in a system which will establish the location of the earth's horizon; that is, the location of the gradient between low and high radiation.

The most successful apparatus heretofore utilized to sense the horizon with substantial accuracy operates on a continuous scanning principle. In other words the means for imaging the earth's horizon on the infrared detector is continually moving so that the output of the detector fluctuates as the field of view projected on the detector sweeps back and forth between space and earth. The fluctuating output of the detector can then be used to drive the sensor to a position so that the detector output fluctuates about a selected point on the horizon gradient. However, one of the problems of the continuous-scanning sensor is that it requires a rapidly moving continuous drive mechanism with attendant problems of high weight, high energy requirements, running bearings which tend to seize in vacuum operation, and in general has a reliability function commensurate with a continuously moving system.

An object of the present invention is to provide a radiation gradient sensing device which will provide a high degree of accuracy without any continuously moving parts and thus without the problems attendant thereto.

More specifically an object of the invention is to provide a radiation gradient sensing device which will require only enough movement to permit the device to track the earth's horizon as the space craft changes attitude or altitude.

A further object of the invention is to mount the movable tracking member of the sensing device on a support and drive system which does not require any bearings. A related object of the invention is to provide an improved thermal motor support and drive system.

Another object of the invention is to provide improved means for measuring the movement of the movable member of the sensing device. A related object of the invention is to provide an improved optical means for measuring angular movement which can accommodate some translational movement of the member whose angular movement is to be measured. Also, an object of the invention is to provide an improved optical reference position detecting system. In both the measuring and referencing systems an object is to operate with a much lower requirement for the light source than is required in systems which image a light source to a single very fine slit.

An additional object of the invention is to provide a radiation gradient sensing device which will be conveniently operable in a search and calibration mode.

A further object of the invention is to provide a radiation gradient sensing device which will be operable in a coarse acquisition mode to detect if the sensor is viewing either constant high level radiation or constant zero radiation. The continuously scanning sensors previously described suffer from the deficiency that they cannot distinguish different levels of constant radiation, only changing levels. Thus, if a space craft should unexpectedly become completely disoriented so that the horizon is not within the scanning range of the sensors, the prior art sensor would not know whether it was pointed too far out in space or too far toward the center of the earth, whereas the present invention sensor would make this distinction.

Other and further objects and features of advantage will become apparent from the following detailed description wherein reference is made to the accompanying drawings in which:

FIGURE 1 is an outside elevational view of a three-unit horizon sensing device according to the invention;

FIGURE 2 is a cross sectional view of the device on the line 2—2 of FIGURE 1, taken through the center of the tracking mirror of the center unit of the device. The dash lines in FIGURE 2 indicate the ray bundle striking the tracking mirror and then being imaged on the radiation detecting unit;

FIGURE 3 is a cross sectional view on the line 3—3 of

FIGURE 1 taken through the center of the angle measuring or readout mirror of the center unit;

FIGURE 4 is a view on the line 4—4 of FIGURE 3 showing the rear of the unit seen from the front in FIGURE 4;

FIGURE 5 is a side elevational view of the tracking mirror and its thermal motor support and drive, with the readout mirror removed. The solid line position of the tracking mirror is its position when the thermal motor is not operated, and the two dash line positions indicate the position of the mirror when the motor is driven in opposite directions;

FIGURE 6 is a side elevational view from the right of FIGURE 4;

FIGURE 7 is a perspective view of one of the bimetallic elements of the thermal motor on enlarged scale;

FIGURE 8 is an edge view of the element of FIGURE 7 and showing a deformed condition of the element as a result of passing heating current therethrough.

FIGURE 9 is a schematic view of the optical readout system as viewed on line 9—9 on FIGURE 3.

FIGURE 10 is a plan view of the readout mask of FIGURE 9 as viewed from the readout mirror;

FIGURE 11 is a schematic view showing the relation between the optical tracking system and the infrared detection thermocouples;

FIGURE 12 is a bottom plan view of the thermocouple array of FIGURE 11;

FIGURE 13 is a graph showing representative infrared radiation gradient curves at the earth's horizon in the spectral region between 14 and 16 microns;

FIGURE 14 is a representative curve showing the electrical output from the thermocouple array which would result if the field of view on the detector array were swept across the horizon gradient;

FIGURE 15 is a block diagram showing an example of suitable electronic circuitry associated with the center sensing unit of the horizon sensor of FIGURE 1; and FIGURE 16 is a schematic view similar to FIGURE 11 but showing modified means for dividing the infrared beam among a plurality of thermocouple detectors.

Referring to the drawings in more detail, a preferred embodiment of an infrared horizon sensor according to the invention is designated as a unit by the reference number 1. The sensor comprises a shell or casing 2 having apertured attachment feet 3 by which it can be bolted to the side of a space craft. In accordance with conventional practice the complete sensor 1 includes a plurality of individual sensing units indicated at 4, 5 and 6, associated with apertures 8, 9 and 10, respectively, in the casing 2. The three sensing units 4–6 are all identical except for location and therefore only one of the units will be described in detail. More specifically unit 4 will be described.

The sensing unit comprises both a system for tracking a radiation source, for example, the earth horizon and a system for constantly relating the tracking position of the tracking unit to the attitude of the space vehicle.

The tracking system comprises a tracking mirror 14, a parabolic reflector 15, and a detector unit 16 which will be hereinafter described in detail. The system also preferably includes a conical radiation shield 17 and a 14–16 micron filter 18. Incoming radiation from the earth's horizon passes through the aperture 8 and is reflected by the mirror 14 onto the parabolic reflector 15. The mirror has a central aperture 19 therein which passes the radiation reflected by the mirror 15. This reflex or folded optical system provides a very compact arrangement. The optical mirror arrangement is such that the incoming radiation from the earth's horizon is imaged and focused on the detector unit 16. If the tracking mirror 14 is pointing to the horizon, the signal from the detector 16 will indicate this fact. Similarly if the mirror is not pointing at the horizon the detector 16 will also indicate this fact and will signal the required movement for causing the mirror 14 to point at the horizon, as will be hereinafter described in more detail.

In order to provide the required motion of the tracking mirror 14, an improved support and motor system is provided as will now be described in detail. The tracking mirror 14 is supported on two pairs of bimetallic strips. One of the pairs of strips is designated 20 and 21 and the other pair of strips is designated 20' and 21', strip 20' being parallel in position and function to the strip 20, and strip 21' being parallel in position and function to the strip 21. Each of the bimetallic strips comprises two pieces of dissimilar metal 22 and 23 having different coefficients of thermal expansion and being bonded together so that when the strip is heated, one of the pieces for example, piece 23 will expand more than the other piece and will cause the composite bimetallic strip to bend to make the side 23 convex and the side 22 concave. The strips 20 and 21 are arranged so that their more expansive sides 23 both face outward as viewed in FIGURE 4 so that when the bimetallic strips 20 and 21 are separately heated one will tilt the mirror in one direction and the other will tilt the mirror in the opposite direction. The pair of bimetallic strips 20' and 21' are arranged in similar manner to their respective counterparts 20 and 21 so that when bimetallic strip 20 is heated, strip 20' is simultaneously heated so that they will both cause a tilting of the mirror 14 in the same direction. Similarly when bimetallic strip 21 is heated, bimetallic strip 21' is simultaneously heated so that they will both cause tilting of the mirror in the same direction.

As shown in FIGURE 4 the strips 20 and 21, and also the strips 20' and 21', are arranged in a cross over or X-pattern, so that they will tend to tilt the mirror 14 about an axis formed by the point of cross over. The four bimetallic strips are mounted on a support pedestal 26 which is secured to the casing 2 by means of screws 27. In order to accommodate the side by side location of the bimetallic strips 20 and 21 the pedestal 26 is provided with an outwardly projecting shoulder 29. Similarly an outwardly projecting shoulder 30 is provided on the opposite side to permit the side by side arrangement of the bimetallic strips 20' and 21'. Each of the bimetallic strips has one of its ends connected to the pedestal 26 and its opposite end connected to the tracking mirror 14. More specifically two slots are provided on each side of the pedestal and mirror and the respective end of one of the strips is held in place by being embedded in a fiber glass plug in the recess. For example, the pedestal end of strip 20 is embedded in a fiber glass plug 31 and the mirror end of the strip is embedded in a plug 32. Strip 21 has one end embedded in a fiber glass plug 33 in the pedestal and its other end embedded in a fiber glass plug 34 in the mirror. The ends of the bimetallic strips 20' and 21' are similarly embedded in fiber glass plugs on the opposite side of the pedestal and mirror. The reason for using the fiber glass plug is not only to provide a strong mechanical bond but to insulate the bimetallic strips from each other both electrically and thermally. The bimetallic strips can be heated most efficiently by heating them directly with current passing therethrough. In order to further increase the efficiency of heating, each bimetallic strip is formed to provide a continuous elongated electrical path. Thus as shown in FIGURE 7 each of the bimetallic strips has a slot 37 at one end and two slots 38 at the other end to provide two separate terminal ends 39 and 40 to which a drive circuit for the motor can be connected.

The crossed arrangement of the bimetallic strips provides a particularly strong and rugged arrangement which both supports and drives the mirror 14 without the need for any bearings. The bimetallic strips can be arranged differently and still provide a tilting action. For example, instead of crossing the strips 20 and 21 they could slope only part way toward each other. However, the crossed arrangement is the most stable.

The tracking system thus far described provides a means whereby the tracking mirror can be caused to point always at the horizon. However, this effect alone is of little value. In order to obtain a beneficial result from the tracking motion of mirror 14, it is necessary to be able to relate the motion and position of the mirror to the remainder of the space craft. The means for measuring the position of the tracking mirror will be called the readout system of the present invention. The readout system comprises a readout mirror 45 mounted in a support bracket 46 which is connected to the tracking mirror by legs 47 and 48. Thus it will be seen that the readout mirror 45 moves with the tracking mirror 14. The tracking arrangement is an optical system which comprises in addition to the mirror 45 a mask and lens system mounted in a tapered shell 49 which is in turn mounted in the main casing 2. A readout objective lens 50 is mounted in the small end of shell 49. The large end of shell 49 carries an arrangement of four readout masks formed by slits in a sheet 52 of material such as metal. The sheet includes a primary counting mask 54, a secondary counting mask 55, a primary reference mask 56, and a secondary reference mask 57. The configuration of the various masks and their interrelation will be hereinafter described in detail. The face of the mask sheet 52 facing the lens 50 is located at the focal plane of the lens. Therefore if the lens has a curved focal plane, the mask sheet 52 will be curved in an arc (FIGURE 3) about the nodal point of the lens. However, the lens 50 can be made with a flat focal plane, and in which case the mask sheet 52 can be flat. Illumination means such as a neon lamp 60 and reflector 61 are behind the primary masks, and light sensitive means such as photovoltaic cells are arranged behind the secondary mask. More specifically at least one and preferably two photovoltaic cells 62 are located behind the reference mask 57. The reason for using two cells is that it is thus possible to cancel out thermal drift in the cells. Two and preferably four photovoltaic cells 64, 65, 66 and 67 are positioned behind the counting mask 55.

The detailed configuration of the counting and the reference masks will now be described. The primary counting mask 54 comprises a series of transparent bars 70 and alternate opaque bars 71. The secondary counting mask 55 is similar to the primary counting mask in that it contains alternate transparent bars 70' and opaque bars 71'. The difference is that the primary and secondary counting masks have slightly different density of opaque bars per inch. For example, the primary mask 54 can have a density of 1000 opaque bars per inch and the secondary mask 55 can have 1004 opaque bars per inch. In mask 54 each of the transparent bars 70 has the same width as each other transparent bar and each opaque bar 71 has the same width as each other opaque bar 71. Preferably the width of each transparent bar is equal to the width of each opaque bar. Similarly in mask 55 all of the transparent bars 70' are of equal width and all of the opaque bars 71' are of equal width. In operation the light from the neon lamp 60 passes through the transparent bars or slits 70 in the primary mask 54, through the lens 50, onto mirror 45 where it is reflected back through the lens, and imaged on the secondary mask 55. As is well known by those skilled in the art, the effect of the superimposed masks will be to provide a moiré pattern on the rear or left side of the secondary mask as viewed in FIGURE 9. A very small movement of mirror 45 about the axis will cause an extremely large movement of the moiré pattern to provide an accurate measurement of the movement of mirror 45 and therefore of the tracking mirror 14, as will be hereinafter described in more detail. It should be noted that since an imaging system is employed the primary and secondary masks need not be positioned closely adjacent each other so no close tolerances are involved. Similarly it should be noted that since all rays falling on mirror 45 are collimated, the measuring system shown in FIGURE 9 is sensitive primarily only to angular movement of mirror 45 and is substantially unaffected by small translational movements of the mirror toward or away from lens 50 or transversely of the lens.

Next the radiation detector unit 16 will be described with particular reference to the schematic showing in FIGURE 11. More specifically the detector comprises an array of three thermocouples 73, 74 and 75 mounted on a backing plate 76. In prior art sensing devices of similar high accuracy, it is necessary to continuously move the field of view back and forth across the detecting device, for example, by continuously oscillating the mirror 14 in the arrangement shown in the drawings. In order to obtain the same high degree of accuracy according to the invention, without continuous motion of mirror 14, the field of view itself has been divided into three parts by means of the three thermocouples 73, 74 and 75 which are positioned directly adjacent to each other and spaced only enough to minimize thermal conduction and eliminate electrical conduction from one to the other. The earth's infrared radiation gradient at the horizon is approximately as shown in FIGURE 13. There is some variation in magnitude of radiation caused by geographical location and also by time of year as indicated in FIGURE 13. However, the shape of the gradient is substantially independent of these variables. In any event, the problem is to provide a tracking system which will always track the same point along the radiation gradient.

The tracking method can best be understood by referring to the optical schematic in FIGURE 11. Incoming radiation from the earth's horizon is reflected from the thermally driven mirror 14 and imaged by reflection from the front surface of the parabolic mirror 15. The focal plane of the parabolic mirror 15 lies on the front surface of the array of thermocouples 73, 74 and 75. The width of the thermocouple array as viewed in FIGURES 11 and 12 is preferably an amount equal to the distance traversed by about three degrees of projected image of the earth's horizon. In other words when the right edge of thermocouple 75 in FIGURE 11 is seeing the physical edge of the earth, the left edge of thermocouple 73 is seeing a point three degrees above the earth. The three degree unit is selected because the radiation gradient shown in FIGURE 13 covers about the same space, namely about three degrees of altitude as viewed from a low altitude space craft. The length of thermocouples 73, 74 and 75 is made about 10° long as viewed in FIGURE 12 to provide a substantial output surface, and is curved to approximate the curvature of the earth's surface.

Thus, assuming that the mirror 14 were directed on the point of symmetry of the horizon gradient curve and the space craft were to move toward or away from the earth, the view imaged on the thermocouple array would shift from the point of symmetry in FIGURE 13 to the right or left depending on the direction of motion. For example, if the space craft were to move up, the view imaged on the thermocouple array would move to the right in FIGURE 13 until the array was seeing only space and therefore substantially no infrared radiation. Similarly, if the space craft moved toward the earth, the view imaged on the thermocouple array would move to the left in FIGURE 13 until the array received entirely throughout its width the full radiation level prevailing on the earth. The electrical output of the thermocouple array is taken as: Output equals the output of thermocouple 73 plus the output of thermocouple 75 minus the output of thermocouple 74. Thermocouples 73 and 75 are each exactly half the width of thermocouple 74 so that when the point of symmetry of the horizon gradient is centered on the thermocouple array the array output will be zero. Displacement of the point of symmetry of the horizon-gradient from the center of the array will produce an output from the thermocouples whose polarity indicates the direction of the displacement and whose magnitude indicates the amount of the displacement. A typical curve of voltage output from the thermocouple array versus displacement of the horizon from the center of the array is shown in FIGURE 14.

Thus, when the point of symmetry of the radiation gradient falls on the center of the thermocouple 74, the output of thermocouple 73 plus the output of thermocouple 75 will be exactly equal and opposite to the output of thermocouple 74 to give a resultant zero output. Similarly, when all of the thermocouples view only space the output of thermocouples 73 plus 75 will exactly counteract the output of thermocouple 74. Also when all of the thermocouples are subjected to the substantially constant high radiation emanating directly from the earth, the output of thermocouples 73 and 75 will again exactly counteract the output of thermocouple 74 to give a zero reading. Conventional electronic circuitry can be provided to energize the bimetallic strips 20, 20', 21 and 21' in the proper sense to drive the mirror 14 in the required direction as indicated by a positive or negative output toward the field centered position as indicated in FIGURE 14 and thus to tend to maintain the mirror 14 always pointing at the same point on the horizon gradient.

By way of example a suitable electronic tracking circuit for the apparatus is shown schematically in the upper part of FIGURE 15. More specifically the DC output from detector array is converted to AC in a chopper 80 which is then amplified in a signal amplifier 81. The amplified signal is delivered to demodulator 82 which returns the signal to DC form. The conversion to AC and back to DC, of course, is performed to minimize DC drift in the amplifier. After demodulation the DC error signal is applied to a drive phase inverter 84. The phase inverter outputs feed the "up" and "down" drive amplifiers 85 and 86 which in turn rotate the thermal mirror to null out the DC error signal. More specifically one of the drive amplifiers is connected to the bimetallic strips 20, 20' and the other drive amplifier is connected to the strips 21, 21'. The dashed line 87 represents the optical circuit from mirror 14 to the parabolic mirror 15 and thence to the thermocouple array 16. It should be understood that since the thermal strips 20, 20' and also strips 21, 21' operate in opposition, changes in ambient temperature will not cause any tilting movement of the tracking mirror.

Suitable circuitry can also be associated to provide search and calibration logic for the apparatus. For example, one arrangement is shown in FIGURE 15 in a line of blocks underneath the line of blocks just described for the thermal motor drive system. The arrangement shown would be typical for operation of the sensor in conjunction with an on-board computer. The cycle of events during the search and calibrate cycle would be as follows. On command from the space craft, tracking would be interrupted by actuating the search command trigger 89 which would in turn operate the search direction trigger 90 to cause the mirror 14 to start moving toward the space end of its range. A calibration register 91 is provided to apply a DC correction voltage to the chopper 80 to correct for electronic or detector drifts as will be hereinafter described in more detail. During the search cycle the calibration register 91 will be reset to its most negative state. When a reference pulse appears from the readout reference detectors 62, through a reference trigger 92, indicating that the thermal mirror has passed the space end of its operating range, the calibration register 91 will be cycled in a positive direction until a null detection trigger 94 indicates that the output of the demodulator has reached zero. The cycling of the calibration register will then be stopped, and the bias from the calibration register will remain applied to the chopper. At this point calibration is complete and any drifts have been compensated by the calibration register output voltage. The thermal mirror will then reverse its direction and move downwardly toward the earth. As the reference pulse again appears from the readout on the downward search, a readout register 93 will be reset to zero. When the moving field of view reaches the horizon the tracking will resume. All search voltages will be removed from the system and the search-calibrate cycle will end until the next command.

Thus, it will be understood that when the search and calibration cycle begins, horizon tracking is broken and the thermal mirror 14 is driven so that the field of view is moved to the space end of its travel. When the detectors 73–75 are viewing space there will be no net detector output except from electronic and thermal drifts and unbalances. Therefore the time during which the field of view is at the space extreme is used to insert a calibration voltage in the electronics to drive the amplified detector output to zero. The field of view is then moved slowly toward the earth. When the horizon is reached the field of view motion stops, and horizon tracking begins.

A suitable electronic circuit for the readout features will now be described. Referring again to the readout primary and secondary masks 54 and 55 it will be understood by those skilled in the art that the difference between 1000 and 1004 opaque bars per inch will produce a moiré pattern gradually shading from dark to light and back to dark again in a distance of 0.25 inch. A displacement of one mask with respect to the other of only 0.001 inch produces a movement of the moiré shading of 0.25 inch. The direction of the displacement of the mask image controls the direction of the moiré shading displacement. Each of the four photovoltaic cells 64, 65, 66 and 67 is $\frac{1}{16}$ inch wide and so covers $\frac{1}{4}$ of the moiré pattern. As the tracking mirror 14 and with it the readout mirror 45 move, the image of the primary mask will be displaced on the secondary mask 55 to cause movement of the moiré pattern. As a result the output of the four cells will rise and fall, but each successive cell will be 90 electrical degrees out of phase with the preceding cell. A minimum of two cells is required to give the necessary information. However, it is desired to use two cells in series opposition to cancel out any thermal drift in the cells. Thus the alternate cells 64 and 66 are connected together in series opposition as indicated in FIGURE 15 and cells 65 and 67 are similarly connected. Obviously since the cells 64 and 66 are 180° out of phase and connected in opposite directions their outputs will be additive as regards the signal from the moiré pattern but will tend to cancel as regards thermal drifts in the individual cells, and similarly with cells 65 and 67. Thus the output of cells 64 and 66 can be counted in a digital binary counter to measure movement of the tracking mirror, and the output of the cells 65 and 67 can be employed to control whether the counter counts up or down depending on the direction of movement of the moiré pattern. One count will be produced for each 0.0625 inch displacement of the moiré pattern, corresponding to 0.00375 degree movement of the tracking mirror for a spacing of 2.0 inches between the lens 50 and the mask strip 52. The 0.00375 degree movement of the tracking mirror of course corresponds to double the movement or 0.0075 degree change in optical tracking angle.

The digital angular readout system is schematically described in more detail in the lower portion of FIGURE 15. As previously stated the system is designed to provide a digital granularity of 0.0075 degree. As the mirror 14 moves, the two detector pairs of cells in the readout system provide a sine wave and a cosine wave. The signals pass through one complete cycle for a mirror movement of 0.03 degree. One of the two signals is delivered to an amplifier 96 and thence to an in-phase trigger 97, and the other signal is delivered to an amplifier 98 and thence to a quadrature trigger 99. If the state change of these triggers, which is coincident with the zero crossing of the signals applied to the triggers is considered, it will be understood that a state change of the quadrature trigger from negative to positive while the in-phase trigger is in the negative state is an indication of 0.03 degree movement of the mirror in one direction, for example towards space. The negative to positive state change of the quadrature trigger while the in-phase trigger is in the positive state is an indication of a 0.03 degree movement of the mirror in the opposite direction, for example towards the earth. These 0.03 degree increments of mirror movement are counted in the readout counter 93. The readout counter will therefore contain at any time the number of 0.03 degree mirror angle changes that have occurred since the counter was reset. The outputs of the in-phase and quadrature triggers themselves provide two more bits of information which interpolate within the 0.03 increments of the readout counter. The final resolution is therefore 0.0075 degree.

The counting part of the readout previously described will accurately follow change in the angle of the tracking mirror 14, but will not determine the initial position of the mirror. The reference masks 56 and 57 are used to provide a precise reference marker at a known mirror angle. The marker is used to reset the counting register 93 to zero. Such resetting of the counter will occur during each search-calibrate cycle previously described. The reference marker is produced as follows. The primary reference mask 56 consists of transparent bars 102 and opaque bars 103 but with random arrangement; that is, one might determine whether a bar is to be transparent or opaque by flipping a coin. As shown in FIGURE 9 the primary reference mask 56 is imaged on the secondary reference mask 57 by the lens 50 and mirror 45. The secondary mask 57 is a photographic negative of the primary mask 56 so as to have transparent bars 102′ and opaque bars 103′. Obviously only a short length of the primary mask is needed for the secondary mask 57. However, the mask portion 57 will be an exact photographic negative of some area of equal length on the primary mask 56. In addition, the secondary mask 57 has been turned end for end from the position of the primary mask. As a result, when one precise location along the primary mask 56 is exactly imaged on the secondary mask 57 the shadow of the opaque bars 103 will exactly and completely cover the transparent bars 102′ so that no light will be visible behind the secondary reference mask 57. However, a movement of one mask with respect to the other of only 0.001 inch will cause 25 percent of the light to be transmitted, since now there is no correlation between the bar shading on the primary and secondary masks. Light passing through the reference mask 57 is sensed with the photovoltaic cells 62 and delivered to the reference trigger 92 as previously described. As the mirror 14 passes a fixed predetermined angle during a search-calibrate cycle, a reference pulse is produced from the readout reference cells 62. This pulse resets the counter 93 to zero so that any accidental miscounts will be erased and a correct reference for the angular output can be established.

If the horizon is within the tracker's angular range and tilted less than 15 degrees with respect to the tracker's field of view pattern, normal search and acquisition occurs as hereinbefore described. This is the normal or fine acquisition mode, and is the usual method of locking on the earth's horizon. Occasionally, it may be desirable to locate the earth even though the horizon does not fall within the normal acquisition range of any of the trackers. This could occur, for example, if there were a failure or sudden transient in the vehicle control system during orbital injection. Under these emergency conditions, even a relatively coarse indication of the direction of the earth relative to the vehicle axes might allow corrective action to be taken and proper injection to be achieved. Since the proposed sensor uses radiation thermocouples operating in a DC mode rather than thermistor bolometers which require optical chopping, one can determine if a field of view is within the earth or within space at any moment. It should be understood that in the coarse acquisition mode just described, the output of only one, or the sum of the thermocouples 73, 74 and 75, is detected instead of detecting the difference as in the tracking mode. The reason of course is that when the difference is detected the outputs cancel, and give a zero signal for any uniform radiation level, whether high or low. However, when the additive thermocouple output is detected, it will of course be a function of the radiation level seen by the thermocouples. Thus even if the field of view is perfectly stationary and uniform, the additive thermocouple output voltage is different if the detector is viewing space than it is if the detector view is within the earth.

During the search and calibrate cycle, then, each of the tracker unit outputs is examined to determine if the earth or space is within its field at each moment. This earth space indication from each tracker can either be telemetered to the ground for interpretation and corrective action, or automatic logic can be designed to provide vehicle correction signals on board.

FIGURE 16 shows an alternate detector arrangement 16′ for dividing the horizon image into multiple sections so that it can be accurately sensed without continuous scanning motion. More specifically in FIGURE 16 the infrared beam is split optically by a condensing system comprising condensing germanium lenses 106 and 107. The front face of lens 107 is at the focal plane of the parabolic mirror, and the condensing lenses re-image the incoming radiation onto a pair of thermocouples 108 and 109 mounted on a backing plate 110. This front surface is composed of three plane surface portions 111, 112 and 113. The two outside sections 111 and 113 are parallel and make an angle of about 7 degrees with respect to the focal plane of mirror 15. The center section 112 is also tilted 7 degrees with respect to the focal plane but in the opposite direction. The width of sections 111 and 113 are each exactly half of the width of the section 112 as viewed in FIGURE 16. The condensing lenses 106 and 107 image the primary parabola on the thermocouple detectors 108 and 109. However, the divided front surface of the condensing system causes two images to be formed, each slightly displaced from the optical axis. Radiation falling on surfaces 111 and 113 will be imaged on thermocouple 109 whereas radiation falling on surface 112 will be imaged on thermocouple 108. Thus it will be understood that the single thermocouple 109 receives the same radiation and delivers the same output as the combined thermocouples 73 and 75 in the embodiment of FIGURE 12. Thus, when the modification of FIGURE 16 is used, it is simply necessary to connect the thermocouples 108 and 109 in series opposition to deliver their combined output to the chopper 80 as indicated in FIGURE 16 and thence of course into the following circuitry shown in FIGURE 15. The amount of tilt for the surfaces 111–113 is selected to provide a convenient separation distance between the thermocouples 108 and 109.

Although specific details of the present invention are shown and described herein, it is to be understood that modification may be made therein without departing from the spirit and scope of the invention as set forth in the appended claims. For example, it should be understood that although the invention has been particularly described in terms of an infrared sensor for tracking the earth's horizon, it is also suited for sensing other types of radiation gradients.

What is claimed is:

1. A radiation gradient sensing device comprising radiation detection means producing an electrical signal, means for processing said signal, and an optical system for imaging incoming radiation on said detection means, said optical system having a movable optical element, means coupled to said processing means and controllably deformable in response to said signal and connected to said movable optical element to form both the support and drive means for the movable optical element, and readout means for determining the position to which said movable optical element is moved by said deformable means.

2. A radiation gradient sensing device as claimed in claim 1 in which said movable element is a mirror, and said deformable means comprises crossed bimetallic strips each connected at one end to said mirror and at the other end to a common mount.

3. A radiation gradient sensing device as claimed in claim 1 in which said readout means comprises a readout mirror movable with said movable element, a slitted primary counting mask spaced from and facing said readout mirror, illumination means on the side of said primary counting mask opposite from said readout mirror, an imaging lens adjacent said readout mirror and between the readout mirror and the primary mask, a secondary counting mask adjacent said primary mask and having slits therein different in number per unit length than the slits in the primary mask, both of said masks being in the focal plane of said lens, whereby a moiré pattern is visible behind said secondary mask, and light-sensitive means behind said secondary mask for sensing the position of said moiré pattern.

4. A radiation gradient sensing device as claimed in claim 3 further comprising a primary reference mask adjacent said primary counting mask, slits of random width and random spacing in said primary reference mask, a secondary reference mask adjacent said primary reference mask and having a slit pattern which is a photographic negative of the slit pattern in the primary reference mask, and light sensitive means behind said secondary reference mask to detect the one position of said readout mirror which projects the slit pattern of the primary reference mask exactly on the between-slit pattern of the secondary reference mask.

5. A radiation gradient sensing device as claimed in claim 4 in which said movable element is a mirror, and said deformable means comprises crossed bimetallic strips each connected at one end to said mirror and at the other end to a common mount.

6. Optical apparatus for detecting motion of a movable object comprising a reflecting surface on said movable object and forming a readout mirror, a slitted primary counting mask spaced from and facing said readout mirror, illumination means on the side of said primary counting mask opposite from said readout mirror, an imaging lens adjacent said readout mirror and between the readout mirror and the primary mask, a secondary counting mask adjacent said primary mask and having slits therein different in number per unit length than the slits in the primary mask, both of said masks being in the focal plane of said lens, whereby a moiré pattern is visible behind said secondary mask, and light-sensitive means behind said secondary mask for sensing the position of said moiré pattern.

7. Optical apparatus as claimed in claim 6 further comprising a primary reference mask adjacent said primary counting mask, slits of random width and random spacing in said primary reference mask, a secondary reference mask adjacent said primary reference mask and having a slit pattern which is a photographic negative of the slit pattern in the primary reference mask, and light-sensitive means behind said secondary reference mask to detect the one position of said readout mirror which projects the slit pattern of the primary reference mask exactly on the between-slit pattern of the secondary reference mask.

8. A radiation gradient sensing device comprising radiation detection means and means for imaging incoming radiation on the detection means, said detection means comprising an optical condensing system facing said imaging means, the front face of said condensing system being in the focal plane of the imaging system, the front face of said condensing system being divided into three flat adjacent sections each at an angle to the axis of the condensing system, the width of the intermediate section being twice the width of each of the two end sections, a first radiation sensitive element positioned to receive radiation from said intermediate flat section, and a second radiation sensitive element positioned to receive the combined radiation from both of said end sections.

References Cited

UNITED STATES PATENTS

| | | | |
|---|---|---|---|
| 2,886,718 | 5/1959 | Shepherd et al. | |
| 2,999,161 | 9/1961 | Loroff. | |
| 3,175,093 | 3/1965 | Lang. | |
| 3,237,010 | 2/1966 | Elliott et al. | |
| 3,253,153 | 5/1966 | Stoddard | 250—237 |
| 3,304,425 | 2/1967 | Astheimer. | |
| 3,304,028 | 2/1967 | Dryden | 244—1 |
| 3,305,686 | 2/1967 | Carter et al. | 250—203 |
| 3,339,863 | 9/1967 | Webb | 244—1 |

RALPH G. NILSON, Primary Examiner

S. ELBAUM, Assistant Examiner

U.S. Cl. X.R.

244—1; 250—203; 310—4